June 8, 1965　　　　　H. F. FRISBIE　　　　　3,187,354
COMBINATION HUNTING TOOL, HATCHET AND AXE
Filed Jan. 26, 1962　　　　　　　　　　　　2 Sheets-Sheet 1

Herbert F. Frisbie
INVENTOR

BY Robert L. Lainof
ATTORNEY

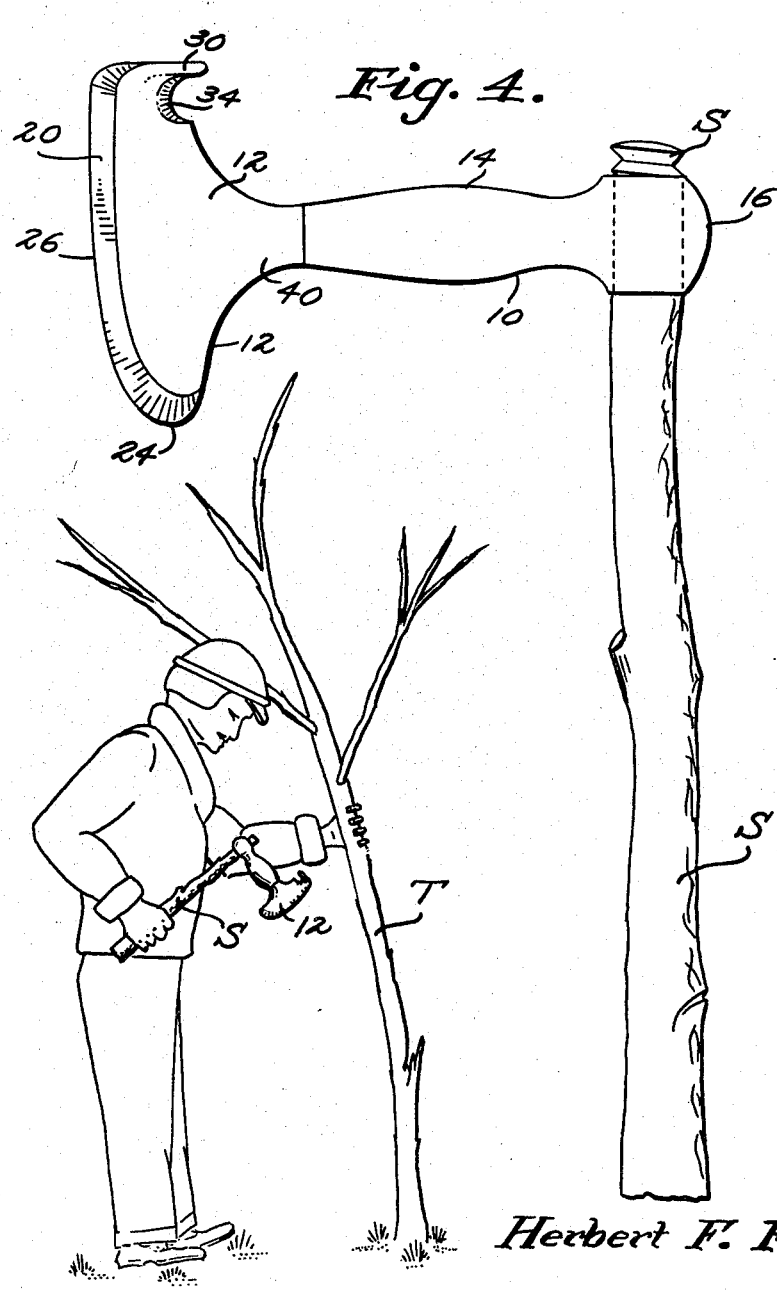

United States Patent Office 3,187,354
Patented June 8, 1965

3,187,354
COMBINATION HUNTING TOOL,
HATCHET AND AXE
Herbert F. Frisbie, 6108 E. Rockglen Court,
Springfield, Va.
Filed Jan. 26, 1962, Ser. No. 168,899
3 Claims. (Cl. 7—14.1)

This invention relates to hunting knives and is designed to be of valuable aid to a hunter in its use as either a hatchet, a knife, an axe or a gutting tool.

One of the objects of my invention is to provide a combination hunting tool, hatchet and axe that is neither cumbersome nor burdensome as a tool to be carried by a hunter.

Another object of my invention is to provide a combination hunting tool which may be easily and quickly converted to the various uses and needs of a hunter.

Another further object of my invention is to provide a hunting tool for the hunter which will obviate the necessity of his carrying a multiple of tools usually required during a hunting trip.

A further object of my invention is to provide a hunting tool which can be used to skin and gut game as well as being converted to use as an axe, a hatchet or a knife.

Another further object of this invention is to provide a multiple combination hunting tool which may be simply and easily converted to use from one tool to another in its design and which will require a minimum of space when carried by the user thereof.

Another and still further object of this invention is to provide a multiple combination hunting tool which is simple in construction, economical to manufacture and which will provide the hunter using same with all the implements generally desired on a hunting trip, and thus obviate the necessity of his carrying individual tools.

Other and further objects and features of this invention will become more apparent from the following detailed description and appended claims, in which:

FIGURE 4 is a view of the tool of my invention shown converted into a hatchet or axe by the addition of a sapling; and FIGURE 5 is a view of the tool of my invention in its use as a hatchet by the user thereof.

Similar characters of references are employed in the above described views to indicate corresponding parts.

Figure 1:
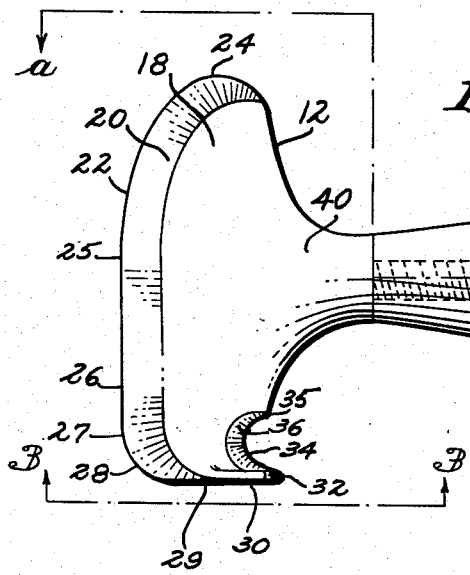
FIGURE 1 is a side elevational view of the multiple hunting tool of my invention.
Figure 2:
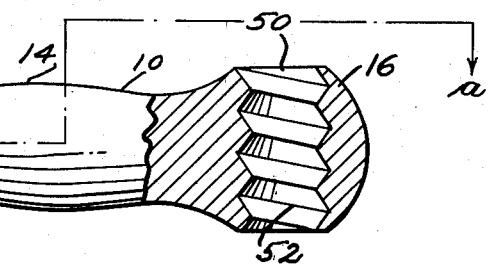
FIGURE 2 is a top plan view of my invention as seen in FIGURE 1.

Referring to the drawings, the numeral 10 indicates the tool of my invention. The tool 10 is provided with a blade section 12, a body section 14 and a rounded end section 16. As seen in FIGURES 1 and 2, section 16 is substantially ball shape in configuration.

As shown in FIGURE 1, the blade section 12 is formed with a blade 18 beveled at 20 on each side thereof, outwardly, to form a knife edge 22.

The knife edge 22 is arcuately curved at its upper end 24, as seen in FIGURE 1, and extends to a point 25 located approximately on the extension of a line parallel to and co-extensive with the upper portion of the body section 14. The edge 22 then extends downwardly on a line 26 perpendicular to the axis "a" of the body section to a point 27 adjacent the bottom of the knife edge.

Figure 3:
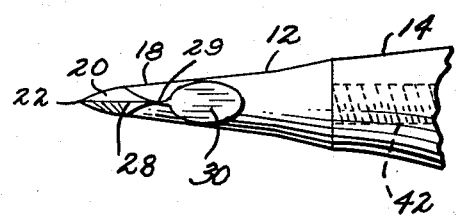
FIGURE 3 is a bottom view of the hunting tool of my invention as seen on the lines 3—3 of FIGURE 1.

From point 27, the lower end 28 of the knife edge 22 is arcuately curved as shown in FIGURE 3 and extends to a broadened flat portion 30. The flat portion 30 of the blade section 12 is oval in configuration as is also shown in FIGURE 3 and is provided with a rounded blunt lip 32.

Centrally upstanding from the flat portion 30 and located on the bottom rear face of the blade section 12 is a knife-like gutting edge 34. As shown in FIGURE 1, the gutting edge 34 is of a small radius arcuate formation and bevelled rearwardly, on each side, at 36. The upper portion of the gutting edge 34 merges into the blade section 12 at 35, as shown in FIGURE 1. The blade section 12 is also provided with a tapered portion 40 at its side opposite the knife edge which is provided with a centrally positioned threaded bolt-like member 42. The member 42 on the blade section 12 is received within an internally threaded opening 44 centrally positioned in the body section 14 longitudinally thereof.

As appears obvious the blade section 12 is connected to the body section 14 by the engagement of the bolt-like member 42 within the opening 44 and threading the members together by rotation in opposite directions. As is believed further obvious, the body section 14 provides a handle for my tool 10 when it is desired to utilize the tool as either a knife or as a gutting tool.

When used as a knife, the edge 22, which has been previously sharpened to present a keen cutting face, is used in the manner normal to wide edged knives. Also, when used as a gutting tool the edge 34 is pulled through the animal which is to be dressed. Obviously, the provision of the blunt portion 32 helps to control the use of the tool when either gutting or skinning the game animal on which it is being used, to prevent excessive cutting of the skin or internal organs of the animal being dressed.

Integrally formed on the body section 14 opposite the end connected to the blade section 12 is a rounded end section 16. As seen in FIGURE 1, the end section 16 is provided with a bore 50 which is internally threaded at 52, for a purpose to be hereinafter explained. The bore 50 is arranged to extend through the rounded end about an axis parallel to line 26 of edge 22.

As will appear obvious, the user of my device can convert the tool into use as a hatchet by cutting a small sapling S with the blade, trimming one end of the sapling and inserting same into snug fit within the bore 50 by revolving the sapling within the bore with respect to the threads 52 formed in the bore. Then with the sapling S applied within the bore 50 as shown in FIGURE 4 and used as a handle, the tool is converted into a hatchet.

As is believed to be further obvious, the size of the sapling is the determining factor in whether the tool is used as either a hatchet or an axe.

Although I have herein above set forth a preferred modification of the operation of my invention, it is considered obvious that the device may be operated in other desired arrangements. The bore 50 could be provided within the body section 14 rather than in the end section 16 in order to use the device as an axe. Also, it is considered obvious that the blade could be formed to extend to the tapered portion 40 on the upper side of the body section in order to use the tool as a brush hook, if it were so desired.

As is believed to be further obvious to those skilled in this art, from the disclosure made here, the tool of my invention could be used additionally as a handicraft tool for cutting hide into strips. Also, the hunter can use the tool as a scraper for defleshing particles of meat from the hide after he has skinned his game.

Numerous modifications and variations of the present invention will occur to those skilled in the art after a careful study of the invention which I have here disclosed. All such modifications and variations which come within the spirit and scope of the present invention are intended to be included herein as fully and completely as if they had been specifically illustrated, described and claimed herein.

The exact construction and relative positioning of the various component parts of this invention is by way of example and may be modified substantially within the scope and spirit of my invention.

What I claim as new is:

1. A hatchet-type hunting tool comprising a body section with an outer cutting edge on one end, said edge being straight and parallel to a hatchet handle in one portion and curved in another portion, and a hatchet handle receiving means in an enlarged ball-shaped portion formed on the other end of said body section, comprising a circular threaded opening passing through said body section perpendicularly to the longitudinal axis of said body section.

2. A hatchet-type hunting tool comprising a body section with a blade section on the outer end, said blade section having a small arcuate-shaped cutting edge on an inner face perpendicular to the longitudinal axis of said body section, and a hatchet handle receiving means in an enlarged ball-shaped portion formed on the other end of said body section comprising a circular threaded opening passing through said body section perpendicularly to the longitudinal axis of said body section.

3. A hatchet-type hunting tool as claimed in claim 2 above, further comprising a flat oval shaped member forming a bottom face on said blade section adjacent to said arcuate-shaped cutting edge and parallel to said longitudinal axis of said body section.

References Cited by the Examiner

UNITED STATES PATENTS

| 111,024 | 1/71 | White | 30—314 |
|---|---|---|---|
| 292,184 | 1/84 | Thompson | 7—8.1 |
| 732,911 | 7/03 | Abbey. | |
| 1,076,103 | 10/13 | Craven. | |
| 1,441,903 | 1/23 | Balaziuk | 7—14.1 |
| 1,562,154 | 11/25 | Erickson | 7—14.1 |
| 1,703,305 | 2/29 | Jenkins | 30—314 |
| 2,335,497 | 11/43 | Ehrsam | 30—314 |
| 2,348,429 | 5/44 | Walker | 30—287 |

FOREIGN PATENTS 79,438  6/55  Denmark.

WILLIAM FELDMAN, *Primary Examiner.*

WALTER A. SCHEEL, MILTON S. MEHR, *Examiners.*